US012664868B2

(12) United States Patent
Gao et al.

(10) Patent No.: US 12,664,868 B2
(45) Date of Patent: Jun. 23, 2026

(54) DRIVER ASSISTANCE METHOD AND DRIVER ASSISTANCE APPARATUS

(71) Applicant: Yinwang Intelligent Technologies Co., Ltd., Shenzhen (CN)

(72) Inventors: Lei Gao, Beijing (CN); Sha Ma, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 147 days.

(21) Appl. No.: 17/940,815

(22) Filed: Sep. 8, 2022

(65) Prior Publication Data

US 2023/0042206 A1      Feb. 9, 2023

Related U.S. Application Data

(63) Continuation of application No. PCT/CN2021/077092, filed on Feb. 20, 2021.

(30) Foreign Application Priority Data

Mar. 10, 2020    (CN) .......................... 202010161761.0

(51) Int. Cl.
*B60W 60/00*          (2020.01)
*B60W 50/08*          (2020.01)
(Continued)

(52) U.S. Cl.
CPC ........... *G08B 21/06* (2013.01); *B60W 50/087* (2013.01); *B60W 50/14* (2013.01);
(Continued)

(58) Field of Classification Search
CPC ..... G08B 21/06; B60W 50/087; B60W 50/14; B60W 60/0051; B60W 2050/143;
(Continued)

(56) References Cited

U.S. PATENT DOCUMENTS

2016/0214619 A1*  7/2016  Na ........................ B60W 50/14
2017/0232973 A1   8/2017  Otake
(Continued)

FOREIGN PATENT DOCUMENTS

CN          105799586 A      7/2016
CN          105818817 A      8/2016
(Continued)

OTHER PUBLICATIONS

Machine Translation: JP-2018020692-A (Year: 2018).*

*Primary Examiner* — Anne Marie Antonucci
*Assistant Examiner* — Connor L Knight
(74) *Attorney, Agent, or Firm* — Leydig, Voit & Mayer, Ltd.

(57)          ABSTRACT

A driver assistance method and a driver assistance apparatus are provided, which may be applied to the field of autonomous driving or intelligent driving. The driver assistance method includes: determining that a driver is in an abnormal state; determining that a first operation performed by the driver on a first terminal is an abnormal operation; and performing first processing, where the first processing includes outputting indication information and/or control information, and the indication information or the control information indicates a second operation performed on the first terminal, or the first processing includes controlling the first terminal to perform the second operation.

12 Claims, 6 Drawing Sheets

(51) Int. Cl.
  *B60W 50/14*          (2020.01)
  *G08B 21/06*          (2006.01)

(52) U.S. Cl.
  CPC ... *B60W 60/0051* (2020.02); *B60W 2050/143* (2013.01); *B60W 2540/10* (2013.01); *B60W 2540/12* (2013.01); *B60W 2540/18* (2013.01); *B60W 2540/221* (2020.02); *B60W 2540/229* (2020.02)

(58) Field of Classification Search
  CPC ......... B60W 2540/10; B60W 2540/12; B60W 2540/18; B60W 2540/221; B60W 2540/229; B60W 2040/0818; B60W 2040/0827; B60W 2040/0836; B60W 2040/0845; B60W 2040/0872; B60W 2050/0088; B60W 2420/403; B60W 40/08; B60W 50/00; B60W 60/0059; B60W 2540/24; B60W 40/09; A61B 2503/22; A61B 5/0077; A61B 5/168; A61B 5/6893; A61B 5/746; A61B 5/18; B60K 28/066; G06V 20/597; G06V 40/174

See application file for complete search history.

(56) References Cited

U.S. PATENT DOCUMENTS

| | | | | |
|---|---|---|---|---|
| 2017/0235306 A1* | 8/2017 | Seki | ...................... | B60K 28/06 |
| | | | | 701/23 |
| 2017/0297566 A1* | 10/2017 | Matsumura | ........... | B60W 40/08 |
| 2019/0337533 A1* | 11/2019 | Kume | .............. | B60W 30/0956 |
| 2020/0124706 A1* | 4/2020 | Buddendick | ......... | G01S 13/343 |
| 2021/0001866 A1* | 1/2021 | Yoshimura | ........... | G06F 18/256 |
| 2021/0155288 A1* | 5/2021 | Takano | .................... | B62D 5/04 |

FOREIGN PATENT DOCUMENTS

| | | | | |
|---|---|---|---|---|
| CN | 107685735 A | 2/2018 | | |
| CN | 108154101 A | 6/2018 | | |
| CN | 109584507 A | 4/2019 | | |
| CN | 109774470 A | 5/2019 | | |
| CN | 110371133 A | 10/2019 | | |
| CN | 110393540 A | 11/2019 | | |
| EP | 3456599 A1 | 3/2019 | | |
| GB | 2500690 A | 10/2013 | | |
| JP | 2018020692 A | * 2/2018 | ............ | B60K 28/06 |
| WO | 2016209423 A1 | 12/2016 | | |

* cited by examiner

DRIVER ASSISTANCE METHOD AND DRIVER ASSISTANCE APPARATUS

CROSS-REFERENCE TO RELATED APPLICATIONS

This application is a continuation of International Application No. PCT/CN2021/077092, filed on Feb. 20, 2021, which claims priority to Chinese Patent Application No. 202010161761.0, filed on Mar. 10, 2020. The disclosures of the aforementioned applications are hereby incorporated by reference in their entireties.

TECHNICAL FIELD

This application relates to the field of autonomous driving, and in particular, to a driver assistance method and a driver assistance apparatus.

BACKGROUND

A driver state is highly related to security of driving or operating a mobile device (for example, a vehicle). When the driver is in an abnormal driving state such as drunk driving, driving with fatigue, or driving while distracted when handling other things (such as making a phone call or picking up things), the driver cannot focus on driving, which greatly increases a possibility of, and is an important cause of, traffic accidents.

To reduce occurrence of such accidents, currently, a driver monitoring system (DMS) is disposed on a vehicle, to monitor and warn a driver, thereby improving driving security and reducing an accident occurrence rate.

The DMS can give feedback such as an alarm to the driver based on a detected driver state.

However, the DMS may give an unpleasant or unnecessary alarm. This seriously affects a practical function of the DMS, resulting in low efficiency of the DMS, and cannot effectively reduce an occurrence rate of traffic accidents.

SUMMARY

This application provides a driver assistance method and a driver assistance apparatus, to avoid generating an unnecessary or unpleasant alarm, improve efficiency and accuracy of a DMS, and further reduce an occurrence rate of traffic accidents.

According to a first aspect, a driver assistance method is provided. The driver assistance method may be performed by a driver assistance apparatus, a driver assistance module (unit), or a driver assistance system integrated into a first terminal, or may be a chip or an integrated circuit on the first terminal. For example, the chip may be a chip in a sensor, a fusion module, or a vehicle-mounted processor. The fusion module may be understood as a module or a unit including a plurality of modules or units, or the fusion module may be understood as a module that obtains information from a plurality of other modules, fuses the information, and outputs fused information. Alternatively, the driver assistance method may be performed by the first terminal, and the first terminal is integrated with the foregoing chip or integrated circuit. The first terminal may be a mobile device. The mobile device may include a device that can move in space or change a spatial shape through a human operation, such as a vehicle, an airplane, an unmanned aerial vehicle, a ship, a bridge crane, or a tower crane. The method includes: determining that a driver is in an abnormal state; determining that a first operation performed by the driver on the first terminal is an abnormal operation; and performing first processing, where the first processing includes outputting indication information and/or control information, and the indication information or the control information is used to indicate a second operation performed on the first terminal, or the first processing includes controlling the first terminal to perform a second operation.

According to the driver assistance method provided in the first aspect, when it is detected that a state of the driver driving the first terminal is the abnormal state, instead of immediately triggering an alarm to the driver or immediately sending another response to the driver, the execution body further determines that the operation performed by the driver on the first terminal is a misoperation, and then makes a response to or an adjustment on the misoperation performed by the driver on the mobile device, that is, performs the first processing. This can avoid generating an unnecessary or unpleasant alarm, improve efficiency and accuracy of feeding back or responding to the driver, and further reduce an occurrence rate of traffic accidents.

It should be understood that, in this embodiment of this application, specific manners of determining that the first operation performed by the driver on the first terminal is the abnormal operation may be the same or different in different abnormal states, and first processing performed in the different abnormal states may be the same or different. This is not limited in this application.

In a possible implementation of the first aspect, the determining that a first operation performed by the driver on the first terminal is an abnormal operation includes: determining that the first operation meets at least one of the following conditions:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal, where further, the first assistance system is different from the second assistance system.

That the operation indicated by the operation decision or the operation indicated by the operation information is inconsistent with the operation performed by the driver on the mobile device includes: operation types are different, or operation types are the same but an operation intensity (e.g., amplitude) difference (or an absolute value of the difference) is greater than a threshold. For example, the operation type may include at least one of an acceleration apparatus operation type, a deceleration apparatus operation type, a direction changing apparatus operation type, and a height changing apparatus operation type.

In this implementation, whether the first operation is the misoperation is determined by using the foregoing conditions, and a determining result is accurate, simple, and easy to implement.

In a possible implementation of the first aspect, the first operation includes an operation of controlling the first terminal to change a motion state. In this implementation, only the operation of controlling the first terminal to change the motion state is considered, and a low-risk or risk-free operation that does not change the motion state of the first terminal is ignored. This improves efficiency and accuracy of feeding back or responding to the driver.

In a possible implementation of the first aspect, the first operation includes at least one of an operation performed on an acceleration apparatus of the first terminal, an operation performed on a braking apparatus of the first terminal, or an operation performed on a steering apparatus of the first terminal.

In a possible implementation of the first aspect, an apparatus for controlling the mobile device to change the motion state may include an acceleration apparatus (for example, an acceleration pedal), a deceleration apparatus (for example, a brake pedal), a steering apparatus (for example, a steering wheel), a moving height control apparatus (for example, a pull rod on an airplane), and the like.

In a possible implementation of the first aspect, the first assistance system or the second assistance system includes at least one of an autonomous driving AD system, an advanced driver assistant system ADAS, or a driver assistance system including at least one driver assistance function.

The driver assistance function includes: a function of determining that the first terminal meets a preset condition, and determining, when the preset condition is met, to change a motion state of the first terminal; and/or a function of determining that the first terminal meets the preset condition, and controlling, when the preset condition is met, the first terminal to change the motion state.

In a possible implementation of the first aspect, the driver assistance function may include an AEB, an LKA, an LCA, an ACC, and the like.

In a possible implementation of the first aspect, the operation indicated by the operation decision from the first assistance system or the operation indicated by the operation information from the second assistance system includes:

one or more of an operation performed on an acceleration apparatus of the first terminal, an operation performed on a braking apparatus of the first terminal, or an operation performed on a steering apparatus of the first terminal.

In a possible implementation of the first aspect, the second operation includes at least one of sending an alarm to the driver, skipping responding to the first operation of the driver, reducing an operation degree of the first operation, or increasing difficulty of the first operation. For example, the sending an alarm to the driver may include an alarm manner such as any one of or a combination of visual, auditory, and tactile sensations.

In a possible implementation of the first aspect, the abnormal state includes at least one of a physiological abnormal state, a mental abnormal state, an attention abnormal state, or an abnormal state that affects an operation performed on the first terminal of the driver.

In a possible implementation of the first aspect, the abnormal state may be one or more of the following abnormal driving states of the driver: drunk driving, drug driving, fatigue driving, or handling other things (for example, making a phone call, picking up things, or smoking). The abnormal state directly affects determining or control performed by the driver on a normal operation on the first terminal, and affects a control capability of the driver on the first terminal.

According to a second aspect, a driver assistance method is provided. The driver assistance method may be performed by a driver assistance apparatus, a driver assistance module (unit), or a driver assistance system integrated into a first terminal, or may be a chip or an integrated circuit on the first terminal. For example, the chip may be a chip in a sensor, a fusion module, or a vehicle-mounted processor. The fusion module may be understood as a module or a unit including a plurality of modules or units, or the fusion module may be understood as a module that obtains information from a plurality of other modules, fuses the information, and outputs fused information. Alternatively, the driver assistance method may be performed by the first terminal, and the first terminal is integrated with the foregoing chip or integrated circuit. The first terminal may be a mobile device. The mobile device may include a device that can move in space or change a spatial shape through a human operation, such as a vehicle, an airplane, an unmanned aerial vehicle, a ship, a bridge crane, or a tower crane. The method includes: determining that a driver is in an abnormal state; and perform second processing, where the second processing includes: adjusting or updating an alarm trigger condition, and/or adjusting or updating an alarm severity, and the alarm trigger condition is used to trigger an alarm to the driver.

According to the driver assistance method provided in the second aspect, when it is detected that a state of the driver driving the mobile device is the abnormal state, instead of immediately triggering the alarm to the driver, the execution body adjusts or updates the alarm trigger condition, adjusts or updates the alarm severity, and/or the like. The mobile device sends the alarm to the driver only after the mobile device meets an adjusted or updated alarm trigger condition. This can avoid generating an unnecessary or unpleasant alarm, improve accuracy and efficiency of sending an alarm to the driver, improve efficiency and accuracy of a DMS, and reduce an occurrence rate of traffic accidents.

In a possible implementation of the second aspect, the abnormal state may be one or more of the following abnormal driving states of the driver: drunk driving, drug driving, fatigue driving, or handling other things (for example, making a phone call, picking up things, or smoking). The abnormal state directly affects determining or control performed by the driver on a normal operation on the first terminal, and affects a control capability of the driver on the first terminal.

It should be understood that, in this embodiment of this application, second processing performed in different abnormal states may be the same or different. This is not limited in this application. For example, second processing corresponding to light fatigue or smoking detected is to raise the alarm severity; or second processing corresponding to light fatigue detected is to adjust the alarm trigger condition and raise the alarm severity, and second processing corresponding to smoking detected is to raise the alarm severity.

In a possible implementation of the second aspect, the adjusting or updating an alarm trigger condition includes:

at least one of adjusting or updating an alarm time point to be earlier than an alarm time point when the driver is in a normal state, or adjusting or updating an alarm distance to be longer than an alarm distance when the driver is in a normal state; and/or the adjusting or updating an alarm severity includes:

adjusting or updating the alarm severity to be higher than an alarm severity when the driver is in the normal state, where the normal state is a state in which the driver performs a normal operation on the first terminal.

In this implementation, the alarm time point is adjusted or updated to be earlier than the alarm time point when the driver is in the normal state, the alarm distance is adjusted or updated to be longer than the alarm distance when the driver is in the normal state, or the alarm severity is adjusted or updated to be higher than the alarm severity when the driver is in the normal state. This can avoid generating an unnecessary or unpleasant alarm, improve accuracy and efficiency of sending an alarm to the driver, and can still ensure timeliness and effectiveness of the alarm.

In a possible implementation of the second aspect, the abnormal state includes at least one of a physiological abnormal state, a mental abnormal state, an attention abnormal state, or an abnormal state that affects an operation performed on the first terminal of the driver.

In a possible implementation of the second aspect, when the driver is in the abnormal state, the method further includes: determining that a first operation performed by the driver on the first terminal is an abnormal operation; and performing first processing, where the first processing includes outputting indication information and/or control information, and the indication information or the control information is used to indicate a second operation performed on the first terminal, or the first processing includes controlling the first terminal to perform a second operation. In this implementation, when it is detected that the state of the driver driving the mobile device is the abnormal state, instead of immediately triggering the alarm to the driver, the execution body adjusts or updates the alarm trigger condition, and/or adjusts the alarm severity. In addition, the execution body further determines that the operation performed by the driver on the first terminal is a misoperation, and then makes a response to or an adjustment on the operation performed by the driver on the mobile device, that is, performs the first processing. This can avoid generating an unnecessary or unpleasant alarm, improve efficiency and accuracy of feeding back or responding to the driver, and further reduce an occurrence rate of traffic accidents.

It should be understood that, in this embodiment of this application, specific manners of determining that the first operation performed by the driver on the first terminal is the abnormal operation may be the same or different in different abnormal states, and first processing performed in the different abnormal states may be the same or different. This is not limited in this application.

In a possible implementation of the second aspect, the determining that a first operation performed by the driver on the first terminal is an abnormal operation includes: determining that the first operation meets at least one of the following conditions:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

In a possible implementation of the second aspect, the first operation includes an operation of controlling the first terminal to change a motion state.

In a possible implementation of the second aspect, the second operation includes at least one of sending an alarm to the driver, skipping responding to the first operation of the driver, reducing an operation degree of the first operation, or increasing difficulty of the first operation. The sending an alarm to the driver may include an alarm manner such as any one of or a combination of visual, auditory, and tactile sensations.

According to a third aspect, a driver assistance apparatus is provided. The driver assistance apparatus includes a unit configured to perform steps in the first aspect or any possible implementation of the first aspect.

According to a fourth aspect, a driver assistance apparatus is provided. The driver assistance apparatus includes a unit configured to perform steps in the second aspect or any possible implementation of the second aspect.

According to a fifth aspect, a driver assistance apparatus is provided. The apparatus includes at least one processor and a memory, and the at least one processor is configured to perform the method in the first aspect or any possible implementation of the first aspect.

According to a sixth aspect, a driver assistance apparatus is provided. The apparatus includes at least one processor and a memory, and the at least one processor is configured to perform the method in the second aspect or any possible implementation of the second aspect.

According to a seventh aspect, a driver assistance apparatus is provided. The apparatus includes at least one processor and an interface circuit, and the at least one processor is configured to perform the method in the first aspect or any possible implementation of the first aspect.

According to an eighth aspect, a driver assistance apparatus is provided. The apparatus includes at least one processor and an interface circuit, and the at least one processor is configured to perform the method in the second aspect or any possible implementation of the second aspect.

According to a ninth aspect, a mobile device is provided. The mobile device includes the driver assistance apparatus provided in the third aspect, the fifth aspect, or the seventh aspect, and/or the driver assistance apparatus provided in the fourth aspect, the sixth aspect, or the eighth aspect. Optionally, the mobile device may include a device that can move in space or change a spatial shape through a human operation, such as a vehicle, an airplane, an unmanned aerial vehicle, a ship, a bridge crane, or a tower crane.

According to a tenth aspect, a computer program product is provided. The computer program product includes a computer program. When the computer program is executed by a processor, the computer program is used to perform the method in the first aspect or any possible implementation of the first aspect, or perform the method in the second aspect or any possible implementation of the second aspect.

According to an eleventh aspect, a computer-readable storage medium is provided. The computer-readable storage medium stores a computer program. When the computer program is executed, the computer program is used to perform the method in the first aspect or any possible implementation of the first aspect, or perform the method in the second aspect or any possible implementation of the second aspect.

According to a twelfth aspect, a chip or an integrated circuit is provided. The chip or the integrated circuit includes a processor, configured to invoke a computer program from a memory and run the computer program, so that a device in which the chip or the integrated circuit is installed performs the method in the first aspect or any possible implementation of the first aspect, or performs the method in the second aspect or any possible implementation of the second aspect. Optionally, the chip may be a chip in a sensor, a fusion module, a vehicle-mounted processor, or the like.

According to the driver assistance method and the driver assistance apparatus provided in embodiments of this application, when it is detected that the state of the driver driving the mobile device is the abnormal state, instead of immediately triggering the alarm to the driver, the execution body further determines that the operation performed by the driver on the mobile device is the misoperation or the abnormal operation, and then generates a feedback for the operation performed by the driver on the mobile device, for example, generates the alarm for the driver. This can avoid generating an unnecessary or unpleasant alarm, improve efficiency and accuracy of the DMS, and further reduce an occurrence rate of traffic accidents.

DESCRIPTION OF EMBODIMENTS

The following describes technical solutions of this application with reference to accompanying drawings.

In the descriptions of embodiments of this application, "I" represents "or" unless otherwise specified. For example, A/B may represent A or B. In this specification, "and/or" describes only an association relationship between associated objects and represents that three relationships may exist. For example, A and/or B may represent the following three cases: only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

A driver state is highly related to security of driving a mobile device (for example, a vehicle). When the driver is in an abnormal driving state such as drunk driving, driving with fatigue, or driving while distracted when handling other things (such as making a phone call or picking up things), the driver cannot focus on driving, which greatly increases a possibility of, and is an important cause of, traffic accidents.

Figure 1:
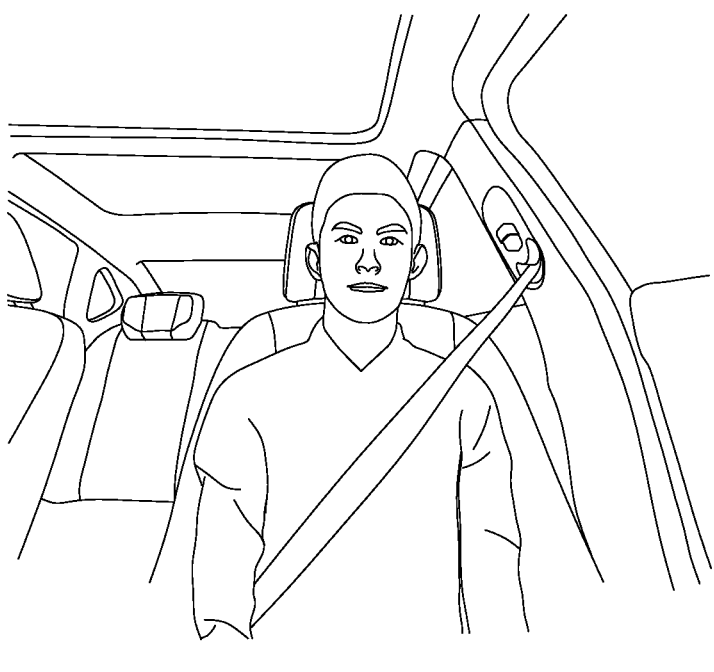
FIG. 1 is a schematic diagram of detection performed by a DMS system when a driver drives a vehicle.

To reduce occurrence of such accidents, currently, a driver monitoring system (DMS) is disposed on a vehicle, and the DMS includes a sensor for detecting a driver state and an analysis module. The analysis module determines the driver state based on data of the sensor. For example, the sensor may detect data such as a facial expression of the driver based on a camera, and the analysis module senses the driver state based on technical means such as image detection of camera data and/or micro-Doppler analysis of radar data, to monitor and warn the driver. This can improve driving security, reduce an accident occurrence rate, and ensure life security and property security of the driver. For example, FIG. 1 is a schematic diagram of detection performed by a DMS system when a driver drives a vehicle. Data such as a facial expression of the driver is detected based on a camera, and a driver state is sensed based on technical means such as facial expression analysis, to monitor and warn the driver, and the like.

Currently, requirements for the DMS in the domestic and international markets are clear, and formulation of related standards has been incorporated into future standard planning roadmaps of a plurality of standard organizations.

The DMS can give feedback such as an alarm to the driver based on the detected driver state. For example, when the DMS detects that the driver is sleepy, the DMS generates an alarm to alert the driver. When the DMS detects that the driver is smoking or making a phone call, the DMS triggers an alarm.

However, the DMS may give an unpleasant or unnecessary alarm.

For example, due to complexities of human behavior and limited performance of the current sensor and a detection algorithm, the current DMS system still has a false recognition rate, and an alarm caused by false recognition is disgusting.

For another example, wrong driving behavior of the driver when the driver is awake is usually intentional, for example, smoking or making a phone call. When the DMS system detects such abnormal states of the driver, an alarm generated is disgusting.

Despite occurrence of any type of disgusting alarm, the following two situations may occur: the driver shuts down the DMS system; or the driver deliberately ignores and shields all alarms of the DMS system or even all alarms of the vehicle. As a result, an actual effect of the DMS is greatly reduced.

Therefore, currently, the DMS may generate an unnecessary or unpleasant alarm, which seriously affects an actual effect of the DMS, causes low efficiency of the DMS, increases an occurrence rate of traffic accidents, and seriously threatens life security and property security of the driver.

In view of this, this application provides a driver assistance method. When it is detected that a state of a driver driving a mobile device is an abnormal state, instead of immediately triggering an alarm to the driver, the execution body further determines that an operation performed by the driver on the mobile device is a misoperation or an abnormal operation, and then generates a feedback for the operation performed by the driver on the mobile device, for example, generates the alarm for the driver. This can avoid generating an unnecessary or unpleasant alarm, improve efficiency and accuracy of the DMS, and further reduce an occurrence rate of traffic accidents.

The driver assistance method provided in this application may be applied to a scenario in which a driver drives or operates a mobile device. In embodiments of this application, the mobile device may include a device that can move in space or change a spatial shape through a human operation, such as a vehicle, an airplane, an unmanned aerial vehicle, a ship, a bridge crane, or a tower crane. A specific form of the mobile device is not limited in this application.

Figure 2:
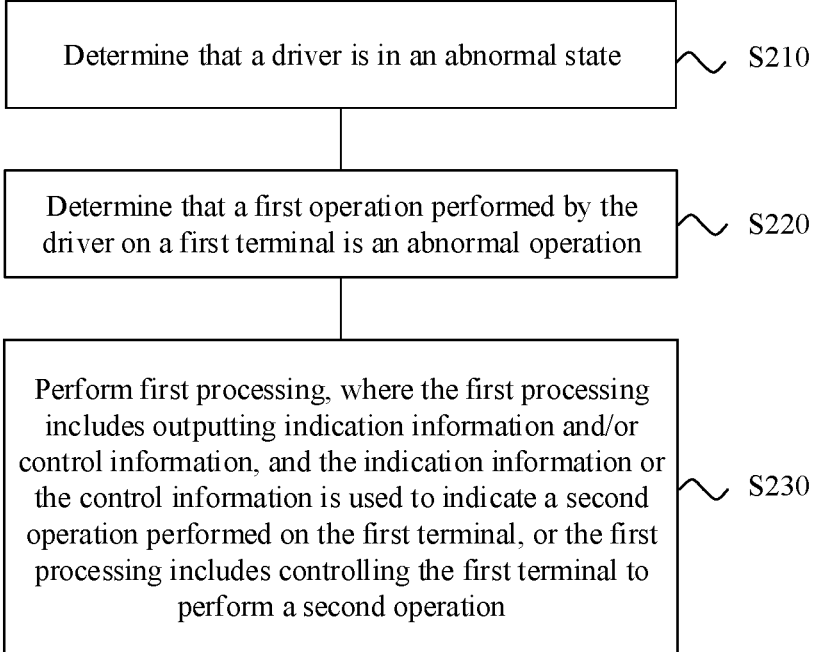
FIG. 2 is a schematic flowchart of an example of a driver assistance method according to an embodiment of this application.

The following describes in detail the driver assistance method provided in this application with reference to FIG. 2. FIG. 2 is a schematic flowchart of the driver assistance method 200 according to an embodiment of this application.

It should be understood that the driver assistance method provided in this application may be performed by a driver assistance apparatus, a driver assistance module (unit), or a driver assistance system integrated into a first terminal. Alternatively, the driver assistance method provided in this application may be performed by a chip or an integrated circuit in the first terminal. For example, the chip may be a chip in a sensor, a fusion module, or a vehicle-mounted processor. The fusion module may include the foregoing driver assistance module (unit), or the fusion module may be understood as a module that obtains information from a plurality of other modules, fuses the information, and outputs fused information. Alternatively, the driver assistance method provided in this application may be performed by the first terminal, and the first terminal is integrated with the foregoing chip or integrated circuit.

Optionally, the driver assistance apparatus or the driver assistance system may include a DMS. Optionally, the driver assistance apparatus or the driver assistance system may further include at least one of an advanced driver assistant system (ADAS), an autonomous driving (AD) system, or a driver assistance system that includes at least one driver assistance function. This is not limited in this application. By way of example, and not limitation, the method may be performed by a chip, a chip system, a processor, or the like used in the driver assistance apparatus or the driver assistance system.

In this embodiment of this application, the first terminal may be the foregoing various types of mobile devices, for example, a vehicle, an unmanned aerial vehicle, and a ship.

As shown in FIG. 2, the method 200 shown in FIG. 2 may include S210 to S230.

The steps in the method 200 are described in detail below with reference to FIG. 2.

S210: Determine that a driver is in an abnormal state.

S220: Determine that a first operation performed by the driver on the first terminal is an abnormal operation.

S230: Perform first processing, where the first processing includes outputting indication information and/or control information, and the indication information or the control information is used to indicate a second operation performed on the first terminal, or the first processing includes controlling the first terminal to perform a second operation.

Specifically, in S210, a driver detection system (for example, a DMS) in the first terminal may detect, in real time, a state of the driver when the driver operates the first terminal. For example, that the driver operates the first terminal may be that the driver is driving a vehicle, the driver is driving an airplane, the driver is driving a ship, or the driver is driving a crane or a tower crane. A specific form in which the driver operates the first terminal is not limited in this embodiment of this application. When the state of the driver when the driver operates the first terminal is detected in real time, whether the driver is in an abnormal state when operating the first terminal is determined.

Optionally, in this embodiment of this application, the abnormal state includes at least one of a physiological abnormal state (for example, physical discomfort), a mental abnormal state (for example, nervousness), an attention abnormal state (for example, lack of attention), or an abnormal state that affects an operation performed on the first terminal (for example, answering a phone call or smoking) of the driver. In other words, the abnormal state may be understood as a state that affects a normal operation performed by the driver on the first terminal. For example, the abnormal state may include one or more of the following abnormal driving states of the driver: drunk driving, driving under the influence of drugs, driving with fatigue, or distracted driving when handling other things (for example, making a phone call, picking up things, or smoking). The abnormal state directly affects determining or control performed by the driver on the normal operation on the first terminal, and affects a control capability of the driver on the first terminal.

For example, an analysis module in the DMS determines a driver state based on data of a sensor. For example, the sensor may detect data such as a facial expression of the driver based on a camera, and the analysis module senses the driver state based on technical means such as image detection of camera data and/or micro-Doppler analysis of radar data, to monitor the driver state, and determine whether the driver is in the abnormal state when the driver operates the first terminal.

In S220, whether an operation performed by the driver on the first terminal is the abnormal operation is determined, that is, whether the operation performed by the driver on the first terminal is a misoperation is determined. For example, the abnormal operation may be that the driver suddenly steps down a throttle at a large amplitude, suddenly turns a steering wheel at a large angle, or suddenly steps down a brake pedal at a large amplitude. In other words, the abnormal operation may be understood as an operation that the driver rarely performed or did not perform before. In this embodiment of this application, a specific form of the abnormal operation is not limited.

In S230, when it is determined that the driver is in the abnormal state when the driver operates the first terminal, and it is determined that the operation performed by the driver on the first terminal is the abnormal operation, the driver assistance apparatus or the driver assistance system performs the first processing. The first processing includes outputting the indication information and/or the control information, and the indication information or the control information is used to indicate the second operation performed on the first terminal, or the first processing includes controlling the first terminal to perform the second operation. In other words, the first processing includes responding to or adjusting the first operation. Because the first operation is the misoperation, the first operation of the driver needs to be intervened or responded to, to avoid a serious traffic accident that may be caused by the first operation. For example, the driver assistance apparatus or the driver assistance system outputs the indication information and/or the control information, where the indication information or the control information is used to indicate the second operation performed on the first terminal. For example, the second operation may include: instructing a loudspeaker or the like in the vehicle to send an alarm to the driver. Alternatively, the driver assistance apparatus or the driver assistance system controls the first terminal to perform the second operation. For example, the driver assistance apparatus or the driver assistance system controls another apparatus (for example, a mechanical apparatus) in the vehicle to reduce a misoperation amplitude of the driver, or eliminate the misoperation of the driver. This can ensure driver security, and avoid traffic accidents.

According to the driver assistance method provided in this application, when it is detected that the state of the driver driving the first terminal is the abnormal state, instead of immediately triggering an alarm to the driver or immediately sending another response to the driver, the execution body further determines that the operation performed by the driver on the first terminal is the misoperation, and then makes the response to or the adjustment on the misoperation performed by the driver on the mobile device, that is, performs the first processing. This can avoid generating an unnecessary or unpleasant alarm, improve efficiency and accuracy of feeding back or responding to the driver, and further reduce an occurrence rate of traffic accidents.

Optionally, in this embodiment of this application, the first processing may not be performed when the first operation performed by the driver on the first terminal is not the abnormal operation, or when the state in which the driver operates the first terminal is not the abnormal state.

It should be understood that, in this embodiment of this application, specific manners of determining that the first operation performed by the driver on the first terminal is the abnormal operation may be the same or different in different abnormal states. In addition, first processing performed in the different abnormal states may be the same or different. This is not limited in this application.

In some possible implementations of this application, in S220, when whether the first operation performed by the driver on the first terminal is the abnormal operation is determined, if the operation performed by the driver on the first terminal meets any one or more of the following conditions, it may be determined that the operation performed by the driver on the first terminal is the abnormal operation. The conditions include:

a change rate of the operation performed by the driver on the first terminal is greater than or equal to a first threshold;

an amplitude of the operation performed by the driver on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Specifically, various sensors and the like on the first terminal may detect the operation performed by the driver on the first terminal. In the following description, an example in which the first terminal is a mobile device is used for description.

In this embodiment of this application, the operation (or the first operation) performed by the driver on the mobile device may be understood as an operation of controlling the mobile device to change a motion state. In other words, the operation performed by the driver on the mobile device may be understood as an operation performed by the driver on an apparatus for controlling the mobile device to change the motion state, for example, an operation performed by the driver on an acceleration apparatus (for example, an acceleration pedal) of the mobile device, an operation performed by the driver on a deceleration apparatus (for example, a brake pedal) of the mobile device, or an operation performed by the driver on a steering apparatus (for example, a steering wheel) of the mobile device. The change of the motion state of the mobile device may include a change of a movement speed, a change of a movement direction, a change of a movement height, and the like. Alternatively, from another perspective, the change of the motion state of the mobile device may include: a change of a transverse motion state, a change of a longitudinal motion state, a change of a motion state in a direction parallel to a gravity direction, and the like. This is not limited in this application.

In this embodiment of this application, the apparatus for controlling the mobile device to change the motion state may include an acceleration apparatus (for example, an acceleration pedal), a deceleration apparatus (for example, a brake pedal), a steering apparatus (for example, a steering wheel), a moving height control apparatus (for example, a pull rod on an airplane), and the like. A type and a specific form of the apparatus for controlling the mobile device to change the motion state are not limited in this embodiment of this application.

The amplitude of the operation performed by the driver on the mobile device may be understood as a quantity of operations performed by the driver on the mobile device or a variation of the operation performed by the driver on the mobile device. Optionally, in this embodiment of this application, the amplitude of the operation may alternatively be an absolute value of the variation of the operation. For example, for stepping down or releasing a throttle, the amplitude of the operation may be a variation of an angle of an acceleration pedal when the accelerator pedal is stepped down or released, where the variation of the angle may be defined as a negative value or a positive value. Alternatively, the amplitude of the operation may be a distance by which the acceleration pedal drops or rises or the like. Optionally, for example, a distance or an angle at which the acceleration pedal drops when the acceleration pedal is stepped down may be defined as a negative value, and a distance or an angle at which the acceleration pedal rises when the acceleration pedal is released may be defined as a positive value. Alternatively, the distance or the angle at which the acceleration pedal drops when the acceleration pedal is stepped down may be defined as a positive value, and the distance or the angle at which the acceleration pedal rises when the acceleration pedal is released may be defined as a negative value. For another example, when the operation is turning the steering wheel, the amplitude of the operation may be understood as a degree of turning the steering wheel, or the like.

The change rate of the operation performed by the driver on the mobile device may be obtained by calculating a reciprocal of the amplitude of the operation and time. It should be understood that, in this embodiment of this application, the amplitude of the operation performed by the driver on the mobile device may be a variation of the operation performed on the mobile device. Because the variation of the operation may be defined as a positive value, or may be defined as a negative value, the change rate of the operation performed by the driver on the mobile device may be a negative value, or may be a positive value. For example, when the operation performed by the driver on the mobile device is stepping down the throttle, the corresponding change rate of the operation may be a positive value. When the operation performed by the driver on the mobile device is releasing the throttle, the corresponding change rate of the operation may be a negative value. For another example, when the operation performed by the driver on the mobile device is stepping down the brake pedal, the corresponding change rate of the operation may be a positive value. When the operation performed by the driver on the mobile device is releasing the brake pedal, the corresponding change rate of the operation may be a negative value.

Therefore, in this embodiment of this application, the first threshold may be a positive value, or may be a negative value. The second threshold may also be a positive value, or may be a negative value. Optionally, the first threshold and the second threshold may be predefined. If an operation change rate of an operation performed by the driver on the mobile device is greater than or equal to the first threshold, or an amplitude of the operation is greater than or equal to the second threshold, it may be determined that the operation is the first operation, namely, the abnormal operation.

In this embodiment of this application, the mobile device may include one or more operation assistance systems. In this application, the operation assistance system may also be referred to as an assistance system. For example, the operation assistance system may be a system that automatically determines that the mobile device can, should, or cannot perform a type or some types of control for changing a motion state, or a system or an apparatus that automatically determines that the mobile device should perform a type or some types of changing a motion state and automatically controls the mobile device to change the motion state. Optionally, in this embodiment of this application, the operation assistance system of the mobile device includes at least one of an AD system, an ADAS, or a driver assistance system including at least one driver assistance function. Optionally, the driver assistance method provided in this application may be performed by the operation assistance system on the mobile.

The driver assistance function includes: a function of determining that the mobile device meets a preset condition and when the mobile device meets the preset condition, automatically determining that the mobile device changes the motion state; and/or a function of automatically determining that the mobile device meets the preset condition and when the mobile device meets the preset condition, automatically controlling the mobile device to change the motion state.

For example, in this embodiment of this application, the driver assistance function may be a function that can automatically determine that the mobile device should perform a longitudinal (e.g., acceleration to a specific degree or deceleration to a specific degree) motion and/or a transverse (e.g., turning to a specific degree or direction) motion. Alternatively, the driver assistance function may further perform a function of performing longitudinal and/or transverse motion control on the mobile device. An implementation of an automatic determining function may be determining whether a current mobile device meets a preset condition, and determining, based on a determining result, whether a type of longitudinal and/or transverse control should be performed on the mobile device. For example, the preset condition may be: whether a distance from a front vehicle is longer than a threshold, a distance or an angle by which the vehicle deviates from a normal lane, or the like.

For example, the driving assistant function may include automatic emergency braking (AEB), lane keep assist (LKA), lane change assist (LCA), adaptive cruise control (ACC), and the like. A specific form of the driving assistant function is not limited in this embodiment of this application.

In this embodiment of this application, an operation performed by the operation assistance system of the mobile device on the mobile device includes at least one of: an operation performed by the operation assistance system of the mobile device on an acceleration apparatus (for example, an acceleration pedal) of the mobile device, an operation performed by the operation assistance system of the mobile device on a braking apparatus (for example, a brake pedal) of the mobile device, an operation performed by the operation assistance system of the mobile device on a steering apparatus (for example, a steering wheel) of the mobile device, or an operation performed by the operation assistance system of the mobile device on a moving height control apparatus (for example, a pull rod) of the mobile device.

For differentiation, in the operation assistance system of the mobile device, a system that can automatically determine that the mobile device can, should, or cannot perform a type or some types of control for changing a motion state is referred to as the first assistance system. In other words, what is output by the first assistance system is an operation decision, and the operation decision is used to indicate another apparatus on the mobile device to perform an operation. The first assistance system itself does not perform the operation indicated by the operation decision. A system or an apparatus that can automatically determine that the mobile device should perform a type or some types of changes in a motion state and automatically control the mobile device to change the motion state is referred to as the second assistance system. In other words, the second assistance system not only can output the operation information, but also can operate an operation indicated by the operation information.

It should be understood that the driver assistance method provided in this application may be performed by the first assistance system, the second assistance system, or another assistance system on the mobile device. Optionally, the first assistance system, the second assistance system, and the another assistance system may be the same, or may be different.

When the operation indicated by the operation decision of the first assistance system is inconsistent with the operation performed by the driver on the first terminal, and/or when the operation indicated by the operation information of the second assistance system is inconsistent with the operation performed by the driver on the first terminal, the operation performed by the driver on the first terminal is the first operation, namely, the abnormal operation.

That the operation indicated by the operation decision or the operation indicated by the operation information is inconsistent with the operation performed by the driver on the mobile device includes: operation types are different, or operation types are the same but an operation intensity (e.g., amplitude) difference (or an absolute value of the difference) is greater than a threshold. For example, the operation type may include at least one of an acceleration apparatus operation type, a deceleration apparatus operation type, a direction changing apparatus operation type, and a height changing apparatus operation type.

For example, that the operation types are different may include: the operation indicated by the operation decision of the operation assistance system of the mobile device is an operation performed on the acceleration apparatus of the mobile device, or the operation indicated by the operation information is an operation performed on the acceleration apparatus of the mobile device, while an operation performed by the driver is an operation performed on a non-acceleration apparatus (for example, a braking apparatus, a steering apparatus, or a height control apparatus) of the mobile device. For another example, it is determined that the operation indicated by the operation decision of the operation assistance system of the mobile device is the operation should be performed on the braking apparatus of the mobile device, or the operation indicated by the operation information is an operation performed on the braking apparatus of the mobile device, while the operation performed by the driver is an operation performed on a non-braking apparatus (for example, the acceleration apparatus, the steering apparatus, or the height control apparatus) of the mobile device.

For example, that the operation types are the same but the operation amplitude difference (or the absolute value of the difference) is greater than a threshold may include: The operation assistance system of the mobile device determines that an operation should be performed on the acceleration apparatus of the mobile device, or performs the operation on the acceleration apparatus of the mobile device, and the operation performed by the driver is also the operation performed on the acceleration apparatus of the mobile device, but a difference (or an absolute value of the difference) between operation amplitudes of the two operations is greater than or equal to the preset threshold.

For example, the acceleration apparatus is an acceleration pedal, an angle or a distance at which the operation assistance system of the mobile device determines that the acceleration pedal of the mobile device should be stepped down (or performs stepping down on the acceleration pedal of the mobile device) is D1, and an angle or a distance at which the driver steps down the acceleration pedal is D2, if $D1-D2 \geq T$, where T is a preset threshold, it is determined that the determining or operation performed by the operation assistance system of the mobile device on the mobile device is inconsistent with the operation performed by the driver on the mobile device.

Alternatively, if $|D1-D2| \geq S$ is met, and S is a preset threshold, it may also be determined that the determining or operation performed by the operation assistance system of the mobile device on the mobile device is inconsistent with the operation performed by the driver on the mobile device. For example, the operation assistance system determines that the acceleration pedal should be raised by D1, but the driver steps down by D2. In this case, D2 is a negative value, and D1 is a positive value; or if D2 is a positive value, and D1 is a negative value, it may be determined, by using whether $|D1-D2| \geq S$ is met, whether the determining or operation performed by the operation assistance system on the mobile device is consistent with the operation performed by the driver on the mobile device.

Optionally, in some possible implementations of this application, when the state of the driver driving the mobile device is the abnormal state, and it is determined that the operation performed by the driver on the mobile device is the misoperation, the first processing may be performed. In this embodiment of this application, the first processing includes outputting the indication information and/or the control information, and the indication information or the control information is used to indicate the second operation performed on the mobile device; or the first processing includes controlling the mobile device to perform the second operation. The second operation includes: at least one of sending an alarm to the driver, skipping responding to the first operation of the driver, reducing an operation degree of the first operation, or increasing difficulty of the first operation.

For example, the indication information and/or the control information may indicate another apparatus on the mobile device to send an alarm to the driver. The sending the alarm to the driver may include an alarm manner such as any one of or a combination of visual, auditory, and tactile sensations. A specific alarm manner is not limited in this embodiment of this application.

The skipping responding to the first operation of the driver may be understood as eliminating the misoperation of the driver, namely, skipping responding to the first operation performed by the driver on the mobile device. For example, when the driver steps down the acceleration pedal deeply, the vehicle does not accelerate. For another example, when the driver turns the steering wheel, the driving direction of the vehicle does not change. Especially when an AD/ADAS function is working, if a current operation of the driver is determined to be the misoperation rather than an operation that the driver intends to take over the vehicle, the working AD/ADAS function is not interrupted. Optionally, the driver may be prompted to reoperate after returning to a normal driving state.

The reducing the operation degree of the first operation may be understood as reducing an effect of the first operation on the mobile device, or reducing efficiency of the first operation. For example, if the first operation is stepping down the acceleration pedal deeply, the reducing the operation degree of the first operation may be understood as that the mobile device still provides only slow acceleration even if the driver steps down the acceleration pedal deeply. For another example, if the first operation is turning the steering wheel sharply, the reducing the operation degree of the first operation may be understood as that when the driver turns the steering wheel sharply, the driving direction of the vehicle still changes slowly.

The increasing difficulty of the first operation may be understood as increasing a force required by the driver to operate the mobile device. For example, assuming that the first operation is stepping down the acceleration pedal sharply, the driver needs a force of 5 N to step down the acceleration pedal sharply in a normal state. When the driver is in the abnormal state, a force of 10 N is required to step down the acceleration pedal to achieve the same effect as an effect of using the force of 5 N to step down the acceleration pedal sharply in the normal state. That is, the force required when the driver steps down the acceleration pedal is increased. Alternatively, compared with a case in which the driver is in the normal state and the steering wheel changes at a same angle, a force (e.g., a required strength) required for turning the steering wheel when the driver is in the abnormal state is greater than a force (e.g., a required strength) required when the driver is in the normal state.

It should be understood that, in this embodiment of this application, the second operation may further include an operation of another type or manner, another response or adjustment to the first operation, or the like, provided that the operation can remind the driver that the driver is currently in a non-secure operation state and reduce occurrence of the security accidents. This is not limited in this embodiment of this application.

This application further provides a driver assistance method. When it is detected that a state of a driver driving a mobile device is an abnormal state, instead of immediately triggering an alarm to the driver, an execution body adjusts or updates an alarm trigger condition, and/or adjusts or updates an alarm severity; and then sends the alarm to the driver only after an adjusted or updated trigger condition is met, or sends the alarm to the driver after the alarm severity is adjusted or updated. This can avoid generating an unnecessary or unpleasant alarm, improve accuracy and efficiency of sending the alarm to the driver, improve efficiency and accuracy of a DMS, and reduce the occurrence rate of traffic accidents.

Figures 3, 4:
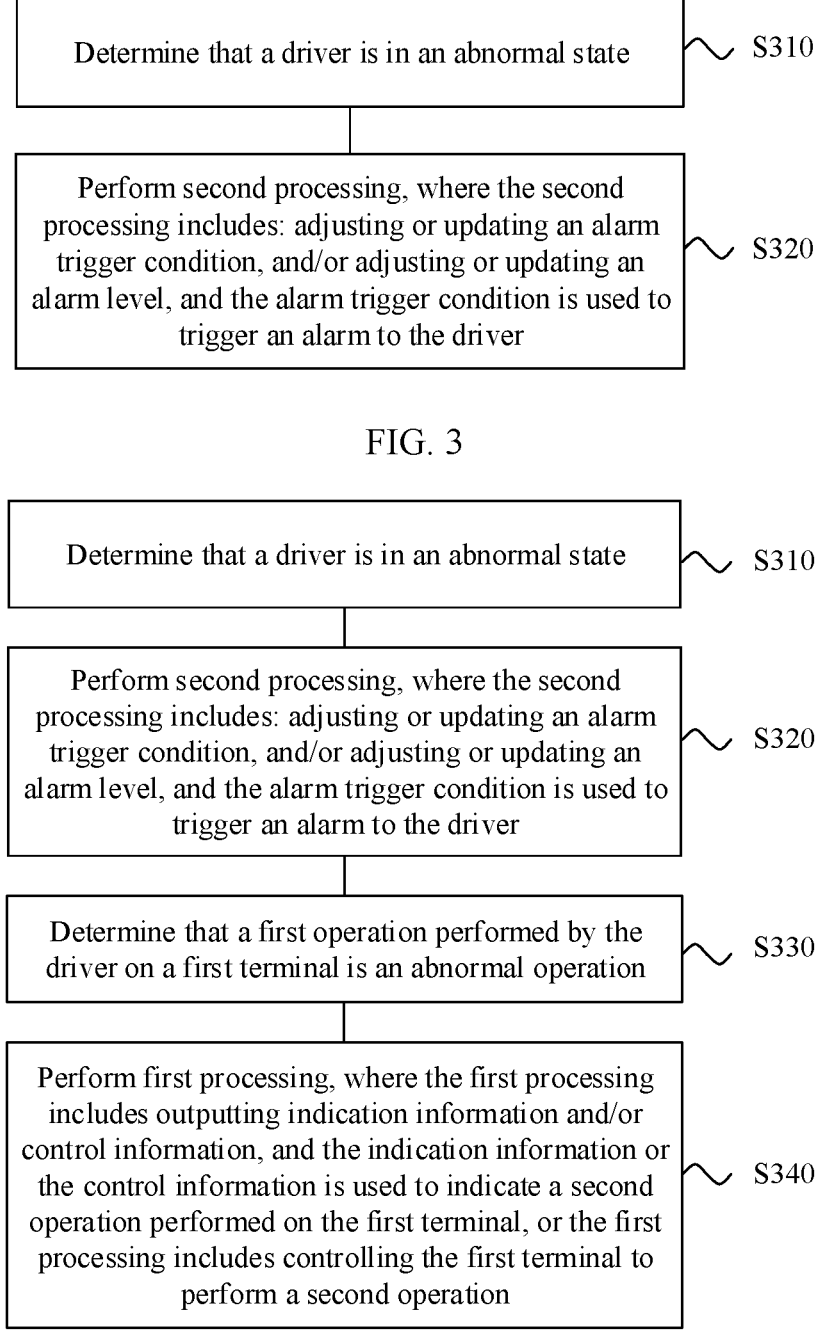
FIG. 3 is a schematic flowchart of another example of driver assistance according to an embodiment of this application.
FIG. 4 is a schematic flowchart of still another example of a driver assistance method according to an embodiment of this application.

The following describes in detail the driver assistance method provided in this application with reference to FIG. 3. FIG. 3 is a schematic flowchart of the driver assistance method 300 according to an embodiment of this application.

It should be understood that, in this embodiment of this application, the driver assistance method may be performed by a driver assistance apparatus or a driver assistance system integrated into a first terminal. Optionally, the driver assistance apparatus or the driver assistance system may include the DMS. Optionally, the driver assistance apparatus or the driver assistance system may further include at least one of an ADAS, an AD system, or a driver assistance system including at least one driver assistance function. This is not limited in this application. By way of example, and not limitation, the method may be performed by a chip, a chip system, a processor, or the like used in the driver assistance apparatus or the driver assistance system. For example, the chip may be a chip in a sensor, a fusion module, a vehicle-mounted processor, or the like. The fusion module may be understood as a module or a unit including a plurality of modules or units, or the fusion module may be understood as a module that obtains information from a plurality of other modules, fuses the information, and outputs fused information.

As shown in FIG. 3, the method 300 shown in FIG. 3 may include S310 and S320. The steps in the method 200 are described in detail below with reference to FIG. 3.

S310: Determine that the driver is in an abnormal state.

S320: Perform second processing, where the second processing includes: adjusting or updating an alarm trigger condition, and/or adjusting or updating an alarm severity, and the alarm trigger condition is used to trigger an alarm to the driver.

Specifically, the abnormal state includes at least one of a physiological abnormal state, a mental abnormal state, an attention abnormal state, or an abnormal state that affects an operation performed on the first terminal of the driver. For example, the abnormal state may include one or more of the following abnormal driving states of the driver: drunk driving, drug driving, fatigue driving, or handling other things (for example, making a phone call, picking up things, or smoking). The abnormal state directly affects determining or control performed by the driver on a normal operation on the first terminal, and affects a control capability of the driver on the first terminal. For a specific process of the step S310, refer to the foregoing descriptions of S210. For brevity, details are not described herein again.

In this embodiment of this application, the first terminal may be the foregoing various types of mobile devices, for example, a vehicle, an unmanned aerial vehicle, and a ship.

In S320, when it is determined that a state of the driver operating the mobile device is the abnormal state, the second processing may be performed. The second processing includes: adjusting or updating the alarm trigger condition, and/or adjusting or updating the alarm severity. The alarm trigger condition is used to trigger the alarm to the driver. In this embodiment of this application, the alarm is used to prompt or warn the driver that the mobile device is currently in a dangerous state, or that if an operation is performed or not performed currently, the mobile device is in a dangerous state, or the like. For example, an operation assistance system on the mobile device may adjust or update an alarm trigger condition, an alarm severity, or the like of a warning function. For a specific description of the operation assistance system of the mobile device, refer to the description of the operation assistance system in the method 200. For brevity, details are not described herein again.

For example, in this embodiment of this application, the AD/ADAS or the like may adjust or update the alarm trigger condition and/or adjust the alarm severity.

According to the driver assistance method provided in this application, when it is detected that the state of the driver driving the mobile device is the abnormal state, instead of immediately triggering the alarm to the driver, the execution body adjusts or updates the alarm trigger condition, adjusts or updates the alarm severity, and/or the like. The mobile device sends the alarm to the driver only after the mobile device meets an adjusted or updated alarm trigger condition. This can avoid generating the unnecessary or unpleasant alarm, improve accuracy and efficiency of sending the alarm to the driver, improve efficiency and accuracy of the DMS, and reduce the occurrence rate of the traffic accidents.

It should be understood that, in this embodiment of this application, second processing performed in different abnormal states may be the same or different. This is not limited in this application. For example, second processing corresponding to light fatigue or smoking detected is to raise the alarm severity; or second processing corresponding to light fatigue detected is to adjust the alarm trigger condition and raise the alarm severity, and second processing corresponding to smoking detected is to raise the alarm severity.

Optionally, in some possible implementations of this application, the adjusting or updating the alarm trigger condition includes at least one of adjusting or updating an alarm time point to be earlier than an alarm time point when the driver is in a normal state, or adjusting or updating an alarm distance to be longer than an alarm distance when the driver is in a normal state.

The adjusting or updating the alarm severity includes: adjusting or updating the alarm severity to be higher than an alarm severity when the driver is in the normal state.

The normal state is a state in which the driver performs a normal operation on the first terminal.

Specifically, for the alarm trigger condition, the alarm may be triggered by using a time standard or by using a distance standard. For the time standard, in this embodiment of this application, the alarm time point may be adjusted to be earlier than an alarm time point when the driver is in a second state. Alternatively, in other words, the alarm time point is updated from the alarm time point corresponding to the driver being in the normal state (referred to as a first alarm time point) to an alarm time point corresponding to the driver being in an abnormal state (referred to as a second alarm time point). That is, the first alarm time point and the second alarm time point may be preconfigured, and corresponding alarm time points may be updated or switched based on different driver states. Alternatively, when it is determined that the driver is in the abnormal state, the first alarm time point may be adjusted to the second alarm time point online. In other words, only one alarm time point may be configured, and the alarm time point is adjusted online based on different driver states. Similarly, for the alarm distance, only one set of alarm distance parameters may be preconfigured, and the alarm distance parameters are adjusted online based on different driver states. Alternatively, a plurality of sets of alarm distance parameters may be preconfigured, and corresponding alarm distance parameters may be updated or switched in different driver states.

The normal state is a state in which the driver performs a normal operation on the first terminal. In other words, the second state does not affect a normal operation, control, or the like of the driver on the mobile device.

In this embodiment of this application, when it is determined that the driver is in the abnormal state, an alarm time point of an alarm function such as the AD/ADAS may be adjusted or updated to be earlier than the alarm time point at which the driver is in the normal state. The following describes a first terminal device as a vehicle with a specific example.

For example, when the driver is in the normal state, an alarm is sent to the driver after T seconds starting from a time point when a distance between the vehicle and a front vehicle is detected to be less than or equal to S meters, to indicate that the vehicle is very close to the front vehicle and needs to brake. However, if the driver is in the abnormal state, and the alarm is immediately sent to the driver from the time point when the distance between the vehicle and the front vehicle is detected to be less than or equal to S meters, to indicate that the vehicle is very close to the front vehicle and needs to brake. That is, an alarm time point of automatic braking is adjusted or updated to be earlier than an alarm time point of automatic braking when the driver is in the normal state.

For another example, when the driver is in the normal state, an alarm is sent to the driver after M seconds starting from a time point when the vehicle is detected to deviate from a currently traveling lane, to indicate that the vehicle deviates from the lane and needs to be kept on the lane. However, if the driver is in the abnormal state, the alarm is immediately sent to the driver from the time point when the vehicle is detected to deviate from the currently traveling lane, to indicate that the vehicle deviates from the lane and needs to be kept on the lane. That is, an alarm time point of lane deviation is adjusted or updated to be earlier than an alarm time point of lane deviation when the driver is in the normal state.

For another example, when the driver is in the normal state, an alarm is sent to the driver for fatigue driving from a time point when a time length for continuously driving the vehicle is greater than a time length T1, to indicate that the driver needs to rest. However, if the driver is in the abnormal state, an alarm is sent to the driver for fatigue driving from a time point when the time length for continuously driving the vehicle is greater than a time length T2, to indicate that the driver needs to rest. T2 is less than T1, that is, an alarm time point of fatigue driving is adjusted or updated to be earlier than an alarm time point of fatigue driving when the driver is in the normal state.

For the distance standard, different states of the driver may correspond to different alarm distances. Optionally, in this embodiment of this application, an alarm distance of an alarm function such as the AD/ADAS may be adjusted to be longer than an alarm distance when the driver is in a normal state. The following describes a first terminal device as a vehicle with a specific example.

For example, when the driver is in the normal state, an alarm is sent to the driver from a time point when the distance between the vehicle and the front vehicle is less than S meters, to indicate that the vehicle is very close to the front vehicle and needs to brake. When the driver is in the abnormal state, the alarm is sent to the driver from a time point when the distance between the vehicle and the front vehicle is less than P meters, to indicate that the vehicle is very close to the front vehicle and needs to brake. P is greater than S, that is, an alarm distance of automatic braking is adjusted or updated to be greater than an alarm distance of automatic braking when the driver is in the normal state.

For another example, when the driver is in the normal state, and a distance between the vehicle and an obstacle around the vehicle is detected to be less than or equal to L1, an alarm is sent to the driver, to indicate that the driver needs to pay attention to an ambient environment. However, if the driver is in the abnormal state, when the distance between the vehicle and the obstacle around the vehicle is detected to be less than or equal to L2, an alarm is sent to the driver, to indicate that the driver needs to pay attention to the ambient environment. L2 is greater than L1. That is, an alarm distance of a vehicle body obstacle is adjusted or updated to be greater than an alarm distance of the vehicle body obstacle when the driver is in the normal state.

In this embodiment of this application, the adjusting or updating the alarm severity to be higher than an alarm severity when the driver is in the normal state may be understood as that when a same alarm trigger condition is met, an alarm severity when the driver is in the abnormal state is higher than the alarm severity when the driver is in the normal state.

Optionally, only one alarm severity may be preconfigured, and the alarm severity is adjusted online in different driver states. Alternatively, a plurality of alarm seventies may be preconfigured, and corresponding alarm seventies may be updated or switched in different driver states.

For example, when the driver is in the normal state, if the distance between the vehicle and the front vehicle is between 10 meters and 20 meters, the alarm severity is level 1; or if the distance between the vehicle and the front vehicle is less than 10 meters, the alarm severity is level 2, where the alarm severity of level 2 is higher than the alarm severity of level 1. A higher level indicates a stronger alarm. When the driver is in the abnormal state, if the distance between the vehicle and the front vehicle is between 10 meters and 20 meters, the alarm severity is level 2; or if the distance between the vehicle and the front vehicle is less than 10 meters, the alarm severity is level 3, where the alarm severity of level 3 is higher than the alarm severity of level 2.

It should be understood that the foregoing description is merely provided by using an example in which the mobile device is a vehicle. In embodiments of this application, for different mobile devices, there may be other different specific implementations of adjusting an alarm time point, adjusting an alarm severity, and adjusting an alarm severity. Specific forms of adjusting the alarm time point, adjusting the alarm severity, and adjusting the alarm severity are not limited in embodiments of this application.

It should be further understood that, in this embodiment of this application, the alarm may include an alarm manner such as visual, auditory, tactile, or a combination of any several of these manners. A specific alarm manner is not limited in embodiments of this application.

In some possible implementations of this application, FIG. 4 is a schematic flowchart of a driving assistant method according to some embodiments of this application. Based on the method steps shown in FIG. 3, the method 300 further includes S330 and S340.

S330: Determine that a first operation performed by the driver on the first terminal is an abnormal operation.

S340: Perform first processing, where the first processing includes outputting indication information and/or control information, and the indication information or the control information is used to indicate a second operation performed on the first terminal, or the first processing includes controlling the first terminal to perform a second operation.

For steps S310 and S320 shown in FIG. 4, refer to the foregoing related descriptions of S310 and S320. For brevity, details are not described herein again.

When it is detected that the state of the driver driving the mobile device is the abnormal state, the alarm trigger condition may be adjusted or updated, and/or the alarm severity may be adjusted or updated. In addition, in S330, whether the operation performed by the driver on the first terminal is the abnormal operation is determined, that is, whether the operation performed by the driver on the first terminal is a misoperation is determined. In S340, when the operation performed by the driver on the first terminal is determined to be the abnormal operation, the first processing is performed, where the first processing includes outputting the indication information and/or the control information, and the indication information or the control information is used to indicate the second operation performed on the first terminal, or the first processing includes controlling the first terminal to perform the second operation.

Optionally, in this embodiment of this application, the second operation includes at least one of sending an alarm to the driver, skipping responding to the first operation of the driver, reducing an operation degree of the first operation, or increasing difficulty of the first operation. This can ensure driver security, and avoid the traffic accidents.

For specific descriptions of S330 and S340, refer to the descriptions of S220 and S330 in the method 200. For brevity, details are not described herein again.

According to the driver assistance method provided in this application, when it is detected that the state of the driver driving the mobile device is the abnormal state, instead of immediately triggering the alarm to the driver, the execution body adjusts or updates the alarm trigger condition, and/or adjusts the alarm severity. In addition, the execution body further determines that the operation performed by the driver on the first terminal is the misoperation, and then makes a response to or an adjustment on the operation performed by the driver on the mobile device, that is, performs the first processing. This can avoid generating the unnecessary or unpleasant alarm, improve efficiency and accuracy of feeding back or responding to the driver, and further reduce the occurrence rate of the traffic accidents.

Optionally, in some possible implementations of this application, in S330, determining that the first operation performed by the driver on the first terminal is the abnormal operation includes: determining that the first operation meets at least one of the following conditions:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Optionally, in some possible implementations of this application, the first operation includes an operation of controlling the first terminal to change a motion state.

Optionally, in some possible implementations of this application, the first operation includes: at least one of an operation performed on an acceleration apparatus of the first terminal, an operation performed on a braking apparatus of the first terminal, or an operation performed on a steering apparatus of the first terminal.

Optionally, in some possible implementations of this application, the first assistance system or the second assistance system includes: at least one of an AD system, an ADAS, or a driver assistance system including at least one driver assistance function.

The driver assistance function includes: a function of determining that the first terminal meets a preset condition, and determining, when the preset condition is met, to change the motion state of the first terminal; and/or a function of determining that the first terminal meets the preset condition, and controlling, when the preset condition is met, the first terminal to change the motion state.

Optionally, in some possible implementations of this application, the operation indicated by the operation decision from the first assistance system or the operation indicated by the operation information from the second assistance system includes: one or more of an operation performed on an acceleration apparatus of the first terminal, an operation performed on a braking apparatus of the first terminal, or an operation performed on a steering apparatus of the first terminal.

It should be understood that for specific descriptions of the foregoing possible implementations, refer to the descriptions in the related embodiment in the method 200. For brevity, details are not described herein again.

It should be further understood that, the foregoing descriptions are merely intended to help a person skilled in the art better understand embodiments of this application, instead of limiting the scope of embodiments of this application. It is apparent that a person skilled in the art may make various equivalent modifications or changes based on the examples provided above. For example, some steps in embodiments in the method 200 and the method 300 may be unnecessary, some steps may be newly added, or the like. Alternatively, any two or more of the foregoing embodiments are combined. A modified, changed, or combined solution also falls within the scope of embodiments of this application.

It should be further understood that the foregoing descriptions of embodiments of this application emphasize differences between embodiments. For same or similar parts that are not mentioned, refer to embodiments. For brevity, details are not described herein again.

It should be further understood that a value of a sequence number of each of the foregoing process does not mean an order of an execution sequence. The execution sequence of each process should be determined based on a function and internal logic of each process, and should not be construed as any limitation on the implementation processes of embodiments of this application.

It should be further understood that in embodiments of this application, "presetting" and "predefinition" may be implemented by prestoring corresponding code or a corresponding table in a device (including, for example, a terminal or a network device) or in another manner that can be used to indicate related information. A specific implementation is not limited in this application.

It should be further understood that division into the manners, cases, categories, and embodiments in embodiments of this application is merely intended for ease of description, and should not constitute a particular limitation. The features in the manners, categories, cases, and embodiments may be combined without contradiction.

It should be further understood that in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

The foregoing describes in detail the driver assistance methods in embodiments of this application with reference to FIG. 1 to FIG. 4. The following describes in detail a driver assistance apparatus in embodiments of this application with reference to FIG. 5 to FIG. 13.

Figure 5:
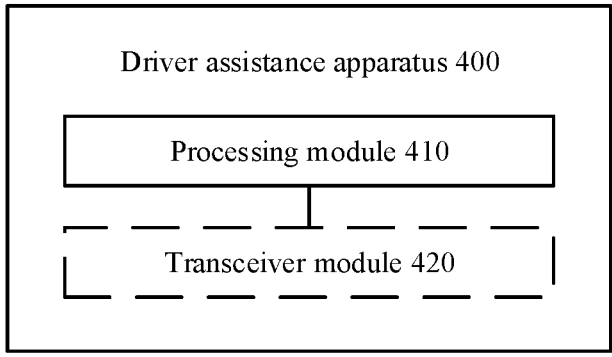
FIG. 5 is a schematic block diagram of a driver assistance apparatus according to an embodiment of this application.

FIG. 5 is a schematic block diagram of a driver assistance apparatus 400 according to an embodiment of this application. The driver assistance apparatus 400 may correspond to the first terminal described in the method 200 or the method 300, or may be a chip, a component, or an integrated circuit applied to the first terminal device, or a chip of a sensor, a fusion module, a vehicle-mounted processor, or the like. In addition, modules or units in the driver assistance apparatus 400 are separately configured to perform actions or processing processes performed in the method 200 or the method 300.

As shown in FIG. 5, the driver assistance apparatus 400 includes a processing module (unit) 410. Optionally, the driver assistance apparatus may further include a transceiver module (unit) 420. The transceiver module 420 is configured to perform specific signal receiving and sending under driving of the processing module 410.

In a possible implementation, the processing module 410 is configured to:

determine that a driver is in an abnormal state;

determine that a first operation performed by the driver on the first terminal is an abnormal operation; and perform first processing, where the first processing includes outputting indication information and/or control information, and the indication information or the control information is used to indicate a second operation performed on the first terminal, or the first processing includes controlling the first terminal to perform a second operation.

According to the driver assistance apparatus provided in this application, when it is detected that a state of the driver driving the first terminal is the abnormal state, instead of immediately triggering an alarm to the driver or immediately sending another response to the driver, an execution body further determines that the operation performed by the driver on the first terminal is a misoperation, and then makes a response to or an adjustment on the misoperation performed by the driver on the mobile device, that is, performs the first processing. This can avoid generating an unnecessary or unpleasant alarm, improve efficiency and accuracy of feeding back or responding to the driver, and further reduce an occurrence rate of traffic accidents.

Optionally, in some embodiments of this application, the processing module 410 is further configured to:

determine, when the first operation meets at least one of the following conditions, that the first operation is the abnormal operation:

the determining that the first operation performed by the driver on the first terminal is the abnormal operation includes: determining that the first operation meets at least one of the following conditions:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Optionally, in some embodiments of this application, the first operation includes an operation of controlling the first terminal to change a motion state.

Optionally, in some embodiments of this application, the first operation includes: at least one of an operation performed on an acceleration apparatus of the first terminal, an operation performed on a braking apparatus of the first terminal, or an operation performed on a steering apparatus of the first terminal.

Optionally, in some embodiments of this application, the first assistance system or the second assistance system includes at least one of an autonomous driving AD system, an advanced driver assistant system ADAS, or a driver assistance system including at least one driver assistance function.

The driver assistance function includes: a function of determining that the first terminal meets a preset condition, and determining, when the preset condition is met, to change the motion state of the first terminal; and/or a function of determining that the first terminal meets the preset condition, and controlling, when the preset condition is met, the first terminal to change the motion state.

Optionally, in some embodiments of this application, the operation indicated by the operation decision from the first assistance system or the operation indicated by the operation information from the second assistance system includes: one or more of an operation performed on an acceleration apparatus of the first terminal, an operation performed on a braking apparatus of the first terminal, or an operation performed on a steering apparatus of the first terminal.

Optionally, in some embodiments of this application, the second operation includes: at least one of sending an alarm to the driver, skipping responding to the first operation of the driver, reducing an operation degree of the first operation, or increasing difficulty of the first operation.

Optionally, in some embodiments of this application, the abnormal state includes at least one of a physiological abnormal state, a mental abnormal state, an attention abnormal state, or an abnormal state that affects an operation performed on the first terminal of the driver.

In another possible implementation, the processing module 410 is configured to:

determine that the driver is in the abnormal state;

perform second processing, where the second processing includes: adjusting or updating an alarm trigger condition, and/or adjusting or updating an alarm severity; and the alarm trigger condition is used to trigger an alarm to the driver.

According to the driver assistance apparatus provided in this application, when it is detected that the state of the driver driving the mobile device is the abnormal state, instead of immediately triggering the alarm to the driver, the execution body adjusts or updates the alarm trigger condition, adjusts or updates the alarm severity, and/or the like. The mobile device sends the alarm to the driver only after the mobile the mobile device meets an adjusted or updated alarm trigger condition. This can avoid generating the unnecessary or unpleasant alarm, improve accuracy and efficiency of sending the alarm to the driver, improve efficiency and accuracy of the DMS, and reduce the occurrence rate of the traffic accidents.

Optionally, in some embodiments of this application, the processing module 410 is further configured to: adjust or update an alarm time point to be earlier than an alarm time point when the driver is in a normal state, adjust or update an alarm distance to be longer than an alarm distance when the driver is in a normal state, or adjust or update an alarm severity to be higher than an alarm severity when the driver is in a normal state.

The normal state is a state in which the driver performs a normal operation on the first terminal.

Optionally, in some embodiments of this application, the abnormal state includes at least one of a physiological abnormal state, a mental abnormal state, an attention abnormal state, or an abnormal state that affects an operation performed on the first terminal of the driver.

Optionally, in some embodiments of this application, when the driver is in the abnormal state, the processing module 410 is further configured to:

determine that a first operation performed by the driver on the first terminal is an abnormal operation; and perform first processing, where the first processing includes outputting indication information and/or control information, and the indication information or the control information is used to indicate a second operation performed on the first terminal, or the first processing includes controlling the first terminal to perform a second operation.

Optionally, in some embodiments of this application, the processing module 410 is further configured to:

determine, when the first operation meets at least one of the following conditions, that the first operation is the abnormal operation:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Optionally, in some embodiments of this application, the first operation includes an operation of controlling the first terminal to change a motion state.

Optionally, in some embodiments of this application, the second operation includes: at least one of sending an alarm to the driver, skipping responding to the first operation of the driver, reducing an operation degree of the first operation, or increasing difficulty of the first operation.

It should be understood that for a specific process of performing the foregoing corresponding steps by the modules (units) in the driver assistance apparatus 400, refer to the foregoing descriptions with reference to related embodiments in the method 200 and the method 300 and FIG. 2 to FIG. 4. For brevity, details are not described herein again.

Optionally, the transceiver module 420 may include a receiving module (unit) and a sending module (unit), configured to perform the steps of receiving information and sending information in embodiments of the method 200 and the method 300.

Further, the driver assistance apparatus 400 may further include a storage module (unit). The transceiver module 420 may be a transceiver, an input/output interface, or an interface circuit. The storage module is configured to store instructions executed by the transceiver module unit 420 and the processing module 410. The transceiver module 420, the processing module 410, and the storage module are coupled to each other. The storage module stores instructions. The processing module 410 is configured to execute the instructions stored in the storage module. The transceiver module 420 is configured to perform specific signal receiving and sending under driving of the processing module 410.

Figure 6:
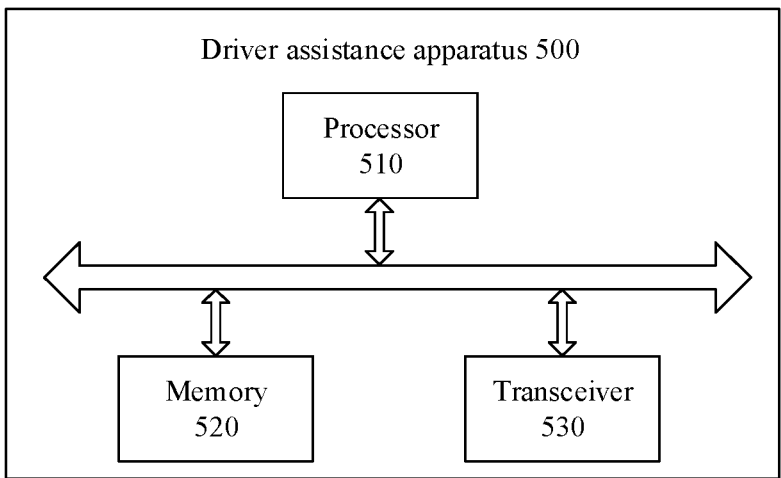
FIG. 6 is a schematic block diagram of another example of a driver assistance apparatus according to an embodiment of this application.

It should be understood that the transceiver module 420 may be a transceiver, an input/output interface, or an interface circuit. The storage module may be a memory. The processing module 410 may be implemented by a processor. As shown in FIG. 6, the driver assistance apparatus 500 may include a processor 510, a memory 520, and a transceiver 530.

The driver assistance apparatus 400 shown in FIG. 5 or the driver assistance apparatus 500 shown in FIG. 6 can implement the steps performed in embodiments of the method 200 and the method 300 and embodiments shown in FIG. 2 to FIG. 4. For similar descriptions, refer to the descriptions in the foregoing corresponding methods. To avoid repetition, details are not described herein again.

It should be further understood that the driver assistance apparatus 400 shown in FIG. 5 or the driver assistance apparatus 500 shown in FIG. 6 may be a driver assistance apparatus, a driver assistance module (unit), or a driver assistance system integrated into the first terminal, or may be a chip or an integrated circuit on the first terminal. For example, the chip may be a chip in a sensor, a fusion module, a vehicle-mounted processor, or the like. The fusion module may include the processing module, the transceiver module, and the like shown in FIG. 5, or may be a first terminal, where the first terminal is integrated with the foregoing chip, integrated circuit, or the like. This is not limited in this embodiment of this application.

Figure 7:
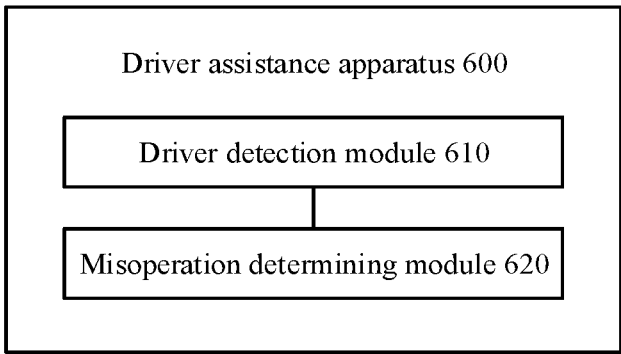
FIG. 7 is a schematic block diagram of still another example of a driver assistance apparatus according to an embodiment of this application.

FIG. 7 is a schematic block diagram of another driver assistance apparatus 600 according to an embodiment of this application. The driver assistance apparatus 400 may correspond to the first terminal described in the method 200, or may be a chip, a component, or an integrated circuit applied to the first terminal device, or a chip of a sensor, a fusion module, a vehicle-mounted processor, or the like. In addition, modules or units in the driver assistance apparatus 600 are separately configured to perform actions or processing processes performed in the method 200.

As shown in FIG. 7, the driver assistance apparatus 600 includes a driver detection module 610 and a misoperation determining module 620.

The driver detection module 610 is configured to detect a state of a driver.

The misoperation determining module 620 is configured to determine whether an operation performed by the driver on a first terminal is an abnormal operation.

The misoperation determining module 620 is further configured to perform first processing when it is determined that the driver is in an abnormal state and that a first operation performed by the driver on the first terminal is the abnormal operation, where the first processing includes outputting indication information and/or control information, and the indication information or the control information is used to indicate a second operation performed on the first terminal, or the first processing includes controlling the first terminal to perform a second operation.

According to the driver assistance apparatus provided in this application, when it is detected that a state of the driver driving the first terminal is the abnormal state, instead of immediately triggering an alarm to the driver or immediately sending another response to the driver, an execution body further determines that the operation performed by the driver on the first terminal is a misoperation, and then makes a response to or an adjustment on the misoperation performed by the driver on the mobile device, that is, performs the first processing. This can avoid generating an unnecessary or unpleasant alarm, improve efficiency and accuracy of feeding back or responding to the driver, and further reduce an occurrence rate of traffic accidents.

Optionally, in some embodiments of this application, the misoperation determining module 620 is further configured to: when the first operation meets at least one of the following conditions, determine that the first operation is the abnormal operation:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Optionally, in some embodiments of this application, the first operation includes an operation of controlling the first terminal to change a motion state.

Optionally, in some embodiments of this application, the first assistance system or the second assistance system includes at least one of an autonomous driving AD system, an advanced driver assistant system ADAS, or a driver assistance system including at least one driver assistance function.

The driver assistance function includes: a function of determining that the first terminal meets a preset condition, and determining, when the preset condition is met, to change the motion state of the first terminal; and/or a function of determining that the first terminal meets the preset condition, and controlling the first terminal to change the motion state when the preset condition is met.

Optionally, in some embodiments of this application, the operation indicated by the operation decision from the first assistance system or the operation indicated by the operation information from the second assistance system includes one or more of an operation performed on an acceleration apparatus of the first terminal, an operation performed on a braking apparatus of the first terminal, or an operation performed on a steering apparatus of the first terminal.

Figure 8:
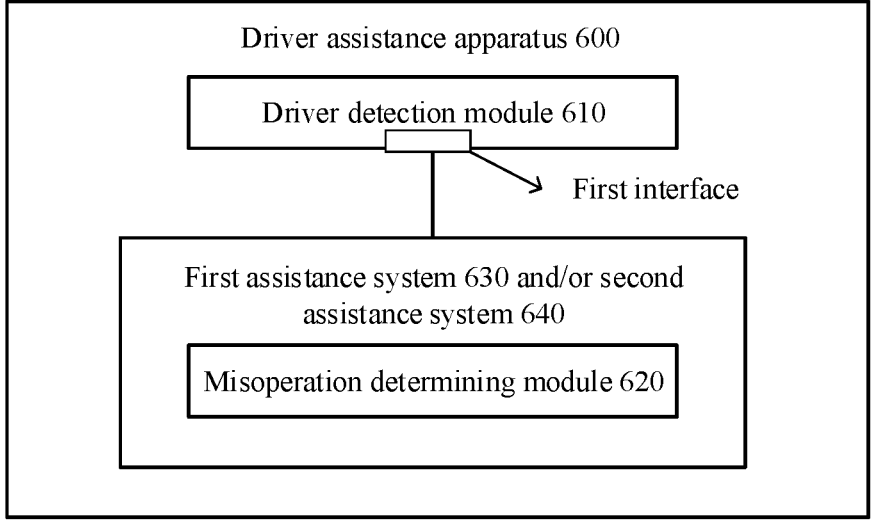
FIG. 8 is a schematic block diagram of still another example of a driver assistance apparatus according to an embodiment of this application.

Optionally, in some embodiments of this application, as shown in FIG. 8, the driver assistance apparatus 600 further includes a first assistance system 630 and/or a second assistance system 640. The first assistance system 630 or the second assistance system 640 includes the misoperation determining module 620, and the driver detection module 610 includes a first interface.

The driver detection module 610 is further configured to send state information of the driver to the first assistance system 630 or the second assistance system 640 through the first interface.

Figure 9:
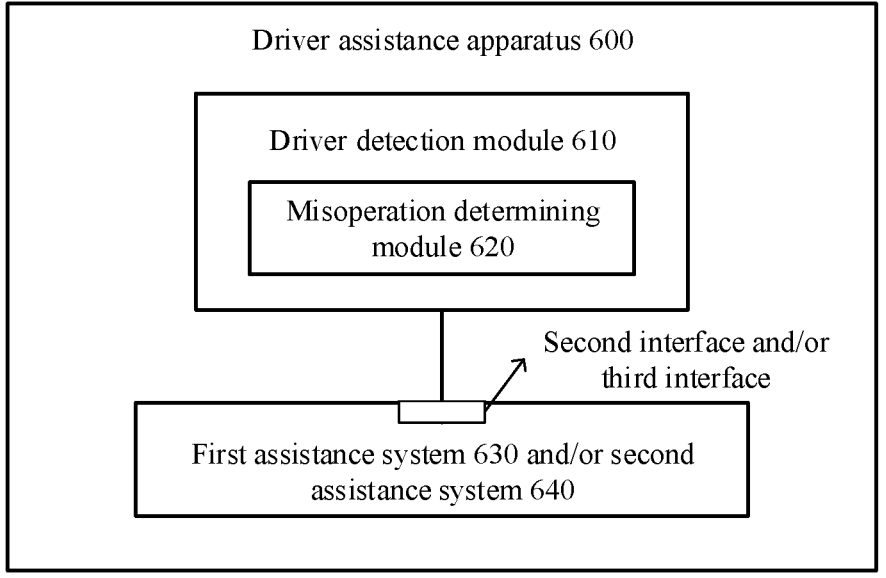
FIG. 9 is a schematic block diagram of still another example of a driver assistance apparatus according to an embodiment of this application.

Optionally, in some embodiments of this application, as shown in FIG. 9, the driver assistance apparatus 600 further includes the first assistance system 630 and/or the second assistance system 640, and the driver detection module 610 includes the misoperation determining module 620.

The first assistance system 630 includes a second interface, and the first assistance system 630 is configured to send an operation decision of the first assistance system 630 to the driver detection module 610 through the second interface; and/or the second assistance system 640 includes a third interface, and the second assistance system is configured to send operation information of the second assistance system 640 to the driver detection module 610 through the third interface.

Figure 10:
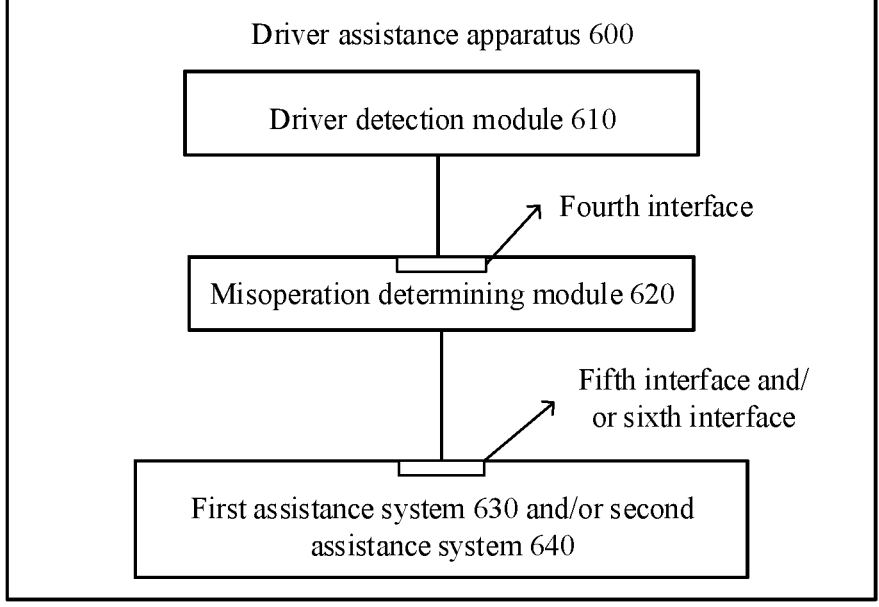
FIG. 10 is a schematic block diagram of still another example of a driver assistance apparatus according to an embodiment of this application.

Optionally, in some embodiments of this application, as shown in FIG. 10, the driver assistance apparatus 600 further includes the first assistance system 630 and/or the second assistance system 640.

The driver detection module 610 includes a fourth interface, and the driver detection module 610 is further configured to send the state information of the driver to the misoperation determining module 620 through the fourth interface.

The first assistance system 630 includes a fifth interface, and the first assistance system 630 is configured to send the operation decision of the first assistance system 630 to the misoperation determining module 620 through the fifth interface; and/or the second assistance system 640 includes a sixth interface, and the second assistance system 640 is configured to send the operation information of the second assistance system 640 to the misoperation determining module 620 through the sixth interface.

It should be understood that for a specific process of performing the foregoing corresponding steps by the modules (units) in the driver assistance apparatus 600, refer to the foregoing descriptions with reference to related embodiments in the method 200. For brevity, details are not described herein again.

Figure 11:
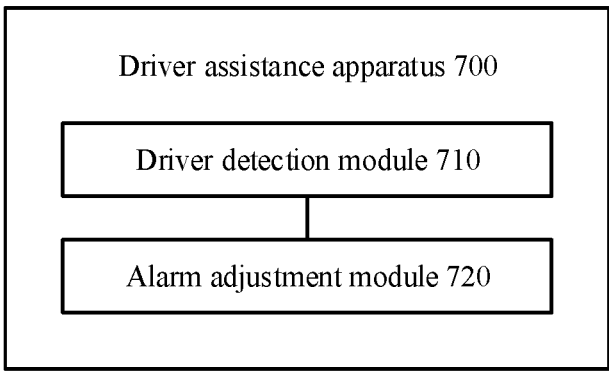
FIG. 11 is a schematic block diagram of still another example of a driver assistance apparatus according to an embodiment of this application.

FIG. 11 is a schematic block diagram of another driver assistance apparatus 700 according to an embodiment of this application. The driver assistance apparatus 700 may correspond to the first terminal described in the method 300, or may be a chip, a component, or an integrated circuit applied to the first terminal device, or a chip of a sensor, a fusion module, a vehicle-mounted processor, or the like. In addition, modules or units in the driver assistance apparatus 700 are separately configured to perform actions or processing processes performed in the method 300.

As shown in FIG. 11, the driver assistance apparatus 700 includes a driver detection module 710 and an alarm adjustment module 720.

The driver detection module 710 is configured to detect a state of a driver.

The alarm adjustment module 720 is configured to perform second processing when it is determined that the driver is in an abnormal state. The second processing includes: adjusting or updating an alarm trigger condition, and/or adjusting or updating an alarm severity, where the alarm trigger condition is used to trigger an alarm to the driver.

According to the driver assistance apparatus provided in this application, when it is detected that a state of the driver driving a mobile device is the abnormal state, instead of immediately triggering an alarm to the driver, an execution body adjusts or updates the alarm trigger condition, adjusts or updates the alarm severity, and/or the like. The mobile device sends the alarm to the driver only after the mobile device meets an adjusted or updated alarm trigger condition. This can avoid generating an unnecessary or unpleasant alarm, improve accuracy and efficiency of sending the alarm to the driver, improve efficiency and accuracy of the DMS, and reduce the occurrence rate of traffic accidents.

Optionally, in some embodiments of this application, the alarm adjustment module 720 is further configured to:

adjust or update an alarm time point to be earlier than an alarm time point when the driver is in a normal state;

adjust or update an alarm distance to be longer than an alarm distance when the driver is in a normal state; and/or adjust or update an alarm severity to be higher than an alarm severity when the driver is in a normal state.

The normal state is a state in which the driver performs a normal operation on the first terminal.

Optionally, in some embodiments of this application, the abnormal state includes at least one of a physiological abnormal state, a mental abnormal state, an attention abnormal state, or an abnormal state that affects an operation performed on the first terminal of the driver.

Figure 12:
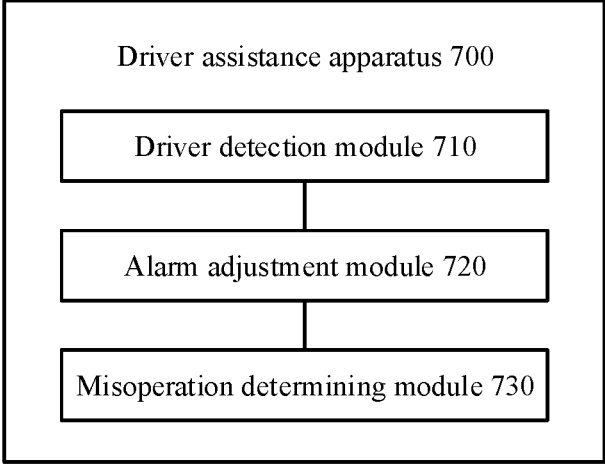
FIG. 12 is a schematic block diagram of still another example of a driver assistance apparatus according to an embodiment of this application.

Optionally, in some embodiments of this application, as shown in FIG. 12, the driver assistance apparatus 700 further includes a misoperation determining module 730.

The misoperation determining module 730 is configured to determine whether an operation performed by the driver on the first terminal is an abnormal operation.

First processing is performed when it is determined that the driver is in the abnormal state and that a first operation performed by the driver on the first terminal is the abnormal operation. The first processing includes outputting indication information and/or control information, and the indication information or the control information is used to indicate a second operation performed on the first terminal, or the first processing includes controlling the first terminal to perform a second operation.

Optionally, in some embodiments of this application, the misoperation determining module 730 is further configured to: when the first operation meets at least one of the following conditions, determine that the first operation is the abnormal operation:

a change rate of the operation performed on the first terminal is greater than or equal to a first threshold;

an amplitude of the operation performed on the first terminal is greater than or equal to a second threshold;

an operation indicated by an operation decision from a first assistance system is inconsistent with the operation performed by the driver on the first terminal; or an operation indicated by operation information from a second assistance system is inconsistent with the operation performed by the driver on the first terminal.

Optionally, in some embodiments of this application, the first operation includes an operation of controlling the first terminal to change a motion state.

Optionally, in some embodiments of this application, the second operation includes at least one of sending an alarm to the driver, skipping responding to the first operation of the driver, reducing an operation degree of the first operation, or increasing difficulty of the first operation.

Figure 13:
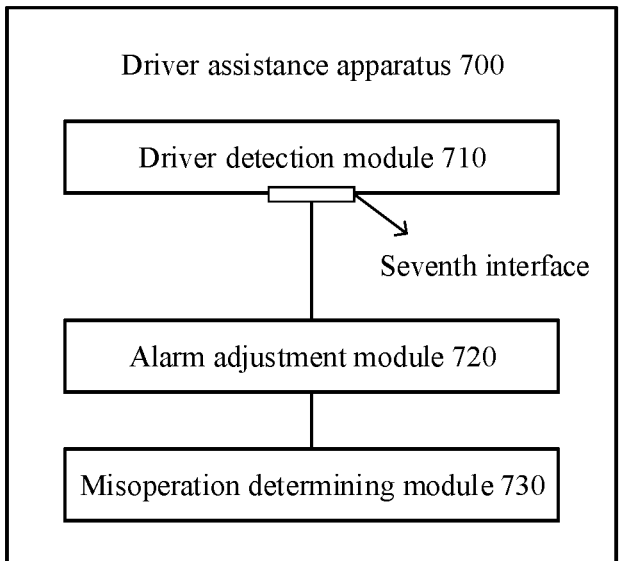
FIG. 13 is a schematic block diagram of still another example of a driver assistance apparatus according to an embodiment of this application.

Optionally, in some embodiments of this application, as shown in FIG. 13, the driver detection module 710 includes a seventh interface, and the driver detection module 710 is further configured to send state information of the driver to the alarm adjustment module 720 through the seventh interface.

It should be understood that for a specific process of performing the foregoing corresponding steps by the modules (units) in the driver assistance apparatus 700, refer to the foregoing descriptions with reference to related embodiments in the method 300. For brevity, details are not described herein again.

It should be understood that, the processor in embodiments of this application may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the program instructions or the computer programs are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium, configured to store computer program code. The computer program includes instructions used to perform the driver assistance methods in embodiments of this application in the method 200 or the method 300. The readable medium may be a read-only memory (ROM) or a random access memory (RAM). This is not limited in this embodiment of this application.

This application further provides a computer program product. The computer program product includes instructions. When the instructions are executed, the driver assistance apparatus separately performs operations corresponding to the method 200 or the method 300.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute computer instructions, so that a chip in the communication apparatus performs any driver assistance method provided in the foregoing embodiments of this application.

Optionally, any driver assistance apparatus provided in embodiments of this application may include the system chip.

Optionally, the computer instructions are stored in a storage unit.

Optionally, the storage unit is a storage unit in the chip, for example, a register or a cache. The storage unit may further be a storage unit, such as a ROM, another type of static storage device that can store static information and instructions, or a RAM, that is outside the chip and that is in the terminal. The processor mentioned anywhere above may be a CPU, a microprocessor, an ASIC, or one or more integrated circuits for controlling program execution of the foregoing driver assistance method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, names may be assigned to various objects such as messages/information/devices/networkelements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, function units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the methods described in embodiments of this application. The storage medium includes a USB flash drive, a removable hard disk, a read-only memory (ROM), a random access.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A driver assistance method, comprising:
determining, based on data provided by a driver sensor system, that a driver is in an abnormal state and identifying the abnormal state of the driver, the abnormal state comprising at least one of a physiological abnormal state, a mental abnormal state, or an attention abnormal state, the driver sensor system comprising one or more driver sensors;
further determining, based on data provided by a first terminal sensor system while the driver is determined to be in the abnormal state, that a first operation performed by the driver on the first terminal is abnormal, the first terminal sensor system comprising one or more terminal sensors, wherein the first operation comprises controlling the first terminal to provide an instructed change in a motion state of a vehicle, and wherein the determining that the first operation is abnormal comprises determining that the first operation meets at least one of the following conditions:
a change rate of the first operation is greater than or equal to a first threshold,
an amplitude of the first operation is greater than or equal to a second threshold, and
a target operation indicated by an operation decision from a first assistance system is inconsistent with the first operation;
performing, as a response to determining that the first operation is abnormal while the driver is determined to be in the abnormal state, a second operation that adjusts the instructed change in the motion state to provide an adjusted change in the motion state of the vehicle, wherein the second operation is determined based on the identified abnormal state of the driver and the first operation performed by the driver; and
controlling the vehicle to implement the adjusted change in the motion state of the vehicle.

2. The driver assistance method according to claim 1, wherein the first operation comprises:
at least one of an operation performed on an acceleration apparatus of the first terminal, an operation performed on a braking apparatus of the first terminal, or an operation performed on a steering apparatus of the first terminal.

3. The method according to claim 2, wherein the driver sensor system includes a camera and a radar, wherein determining that the driver is in the abnormal state comprises analyzing camera data provided by the camera and performing a micro-Doppler analysis of radar data provided by the radar, and wherein the first terminal sensor system includes a steering wheel sensor, an accelerator pedal sensor, and/or a brake pedal sensor.

4. The driver assistance method according to claim 1, wherein:
the first assistance system or the second assistance system comprises at least one of an autonomous driving (AD) system, an advanced driver assistant system (ADAS), or a driver assistance system comprising at least one driver assistance function, and the driver assistance function comprises: a function of determining that the first terminal meets a preset condition, and determining, when the preset condition is met, to change a motion state of the first terminal; and/or a function of determining that the first terminal meets the preset condition, and controlling, when the preset condition is met, the first terminal to change the motion state.

5. The driver assistance method according to claim 1, wherein:
the target operation indicated by the operation decision from the first assistance system or the target operation indicated by the operation information from the second assistance system comprises:
one or more of an operation performed on an acceleration apparatus of the first terminal, an operation performed on a braking apparatus of the first terminal, or an operation performed on a steering apparatus of the first terminal.

6. The driver assistance method according to claim 1, wherein the second operation comprises:
at least one of skipping responding to the instructed change in the motion state of the vehicle or reducing the instructed change in the motion state of the vehicle.

7. The method according to claim 1, further comprising:
adjusting or updating an alarm trigger condition used to trigger an alarm to the driver, and/or adjusting or updating an alarm severity.

8. The driver assistance method according to claim 7, wherein:
the adjusting or updating the alarm trigger condition comprises:
at least one of adjusting or updating an alarm time point to be earlier than an alarm time point when the driver is in a normal state, or adjusting or updating an alarm distance to be longer than an alarm distance when the driver is in a normal state; or
the adjusting or updating the alarm severity comprises:
adjusting or updating the alarm severity to be higher than an alarm severity when the driver is in the normal state, wherein the normal state is a state in which the driver performs a normal operation on a first terminal.

9. An apparatus, comprising:
one or more processors, and
a non-transitory storage medium in communication with the one or more processors, the non-transitory storage medium configured to store program instructions that, responsive to being executed by the one or more processors, cause the apparatus to:
determine, based on data provided by a driver sensor system, that a driver is in an abnormal state and identifying the abnormal state of the driver, the abnormal state comprising at least one of a physiological abnormal state, a mental abnormal state, or an attention abnormal state, the driver sensor system comprising one or more driver sensors;
further determine, based on data provided by a first terminal sensor system while the driver is determined to be in the abnormal state, that a first operation performed by the driver on the first terminal is abnormal, the first terminal sensor system comprising one or more terminal sensors, wherein the first operation comprises controlling the first terminal to provide an instructed change in a motion state of a vehicle, and wherein the determining that the first operation is abnormal comprises determining that the first operation meets at least one of the following conditions:

a change rate of the first operation is greater than or equal to a first threshold, an amplitude of the first operation is greater than or equal to a second threshold, and a target operation indicated by an operation decision from a first assistance system is inconsistent with the first operation;

perform, as a response to determining that the first operation is abnormal while the driver is in the abnormal state, a second operation that adjusts the instructed change in the motion state to provide an adjusted change in the motion state of the vehicle, wherein the second operation is determined based on the identified abnormal state of the driver and the first operation performed by the driver; and controlling the vehicle to implement the adjusted change in the motion state of the vehicle.

10. The apparatus according to claim 9, wherein the first operation comprises:

at least one of an operation performed on an acceleration apparatus of the first terminal, an operation performed on a braking apparatus of the first terminal, or an operation performed on a steering apparatus of the first terminal.

11. The apparatus according to claim 9, wherein:

the first assistance system or the second assistance system comprises at least one of an autonomous driving (AD) system, an advanced driver assistant system (ADAS), or a driver assistance system comprising at least one driver assistance function, and the driver assistance function comprises:

a function of determining that the first terminal meets a preset condition, and determining, responsive to determining that the preset condition is met, to change a motion state of the first terminal; or a function of determining that the first terminal meets the preset condition, and controlling, responsive to determining that the preset condition is met, the first terminal to change the motion state.

12. The method according to claim 11, wherein the second operation is determined based on the identified abnormal state of the driver and one or more of the change rate of the first operation or the amplitude of the first operation.

* * * * *